(12) United States Patent
Oh et al.

(10) Patent No.: US 7,103,105 B2
(45) Date of Patent: Sep. 5, 2006

(54) DATA TRANSMISSION PROTOCOL FOR IMAGE COMMUNICATION APPARATUS

(75) Inventors: Hyung Hoon Oh, Seoul (KR); Byong Khi Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 09/764,064

(22) Filed: Jan. 19, 2001

(65) Prior Publication Data

US 2001/0008547 A1    Jul. 19, 2001

(30) Foreign Application Priority Data

Jan. 19, 2000    (KR) ................................ 2000-2367

(51) Int. Cl.
*H04N 7/12*    (2006.01)
(52) U.S. Cl. ................................ 375/240.27
(58) Field of Classification Search ............. 348/428.1, 348/462, 423.1, 464, 492, 487, 465, 469, 348/467, 423; 375/240.26, 240.28, 240.01, 375/240.12, 240.27, 240, 240.18, 140.08; 380/280, 278, 210, 240, 205; 382/166, 167, 382/165, 232, 238; 386/85, 101, 52
See application file for complete search history.

(56) References Cited

U.S. PATENT DOCUMENTS

| 5,539,823 | A  | * | 7/1996 | Martin ........................ 380/226 |
| 6,111,612 | A  | * | 8/2000 | Ozkan et al. ................ 348/465 |
| 6,125,201 | A  | * | 9/2000 | Zador ......................... 382/248 |
| 6,219,422 | B1 | * | 4/2001 | Sato ............................ 380/240 |
| 6,253,246 | B1 | * | 6/2001 | Nakatsuyama .............. 709/233 |
| 6,363,061 | B1 | * | 3/2002 | Yuzawa ...................... 370/498 |
| 6,543,053 | B1 | * | 4/2003 | Li et al. ...................... 709/217 |
| 6,594,798 | B1 | * | 7/2003 | Chou et al. ................. 714/822 |
| 2003/0113022 | A1 | * | 6/2003 | Hijiri et al. ................. 382/232 |

* cited by examiner

*Primary Examiner*—Vu Le
*Assistant Examiner*—Behrooz Senfi
(74) *Attorney, Agent, or Firm*—Birch, Stewart, Kolasch & Birch, LLP

(57) ABSTRACT

A communication method and data transmission protocol adapted to an image communication apparatus is provided. More particularly, this protocol provides a structure in which video, audio, and control data are multiplexed for communication, wherein loss of data other than video and audio data can be minimized, video, audio, and control data can be easily separated when the receiver side reads a packet data, and its control data can be set so as to select an image quality and a retransmission privacy mode.

7 Claims, 3 Drawing Sheets

FIG.4

| HEADER DATA | DATA SIZE | AUDIO DATA | CONTROL INDEX | CONTROL DATA | VIDEO DATA |

FIG.5A

| A | B | C | D | E | F | ・・・・・ | X | Y | Z |

FIG.5B

| Z | Y | X | W | V | U | ・・・・・ | C | B | A |

FIG.6

| 1 | CRC | IMAGE DATA (64~ 2048BYTES) |
|---|---|---|
| 2 | CRC | IMAGE DATA (64~ 2048BYTES) |
| 3 | CRC | IMAGE DATA (64~ 2048BYTES) |
| 4 | CRC | IMAGE DATA (64~ 2048BYTES) |
| ⁝ | ⁝ | ⁝ |
| 40 | CRC | IMAGE DATA (64~ 2048BYTES) |
| 41 | CRC | IMAGE DATA (64~ 2048BYTES) |
| 42 | CRC | IMAGE DATA (64~ 2048BYTES) |

SN

DATA TRANSMISSION PROTOCOL FOR IMAGE COMMUNICATION APPARATUS

BACKGROUND OF THE INVENTION

1. Field of the Invention

The present invention relates to a communication method adapted to an image communication apparatus, and more particularly, to a data transmission protocol for an image communication apparatus which is capable of minimizing loss of data other than video and audio data and easily separating video, audio, and control data.

2. Description of the Background Art

FIG. 1 is a view illustrating the construction of an image communication apparatus according to the conventional art.

As illustrated therein, the image communication apparatus includes: a CCD 2 for converting an external light inputted via a lens 1 into an electric video signal; a CCD driving unit 3 for transferring the video signal converted by the CCD 2 to a digital signal processor(DSP) 4; a digital signal processor 4 for digitally processing the video signal inputted from the CCD driving unit 3 and outputting the same to be displayed on a monitor 7 in the format of a luminance signal and a color signal for image compression; an image compressing/restoring unit 5 for performing compression/restoration of the video signal; a communication control and interfacing unit 8 for communicating with communication lines and a voice input/output unit 9 for the purpose of transmitting the compressed video signal and receiving the transmitted video signal; and a controlling unit 6 for controlling each part of a system for the purpose of processing, compressing, restoring, and transmitting the above video signal. The operation of the thusly constructed image communication apparatus will now be described.

First, the external light inputted through the lens 1 is converted into an electric signal through the CCD 2 to be supplied to the CCD driving unit 3.

The CCD driving unit 3 corrects the converted video signal for an analog signal of a predetermined level, and thereafter outputs the same to the DSP 4. The DSP 4 performs clamping, RGB(Red Green Blue) color control, brightness control, etc. of the video signal outputted from the CCD driving unit 3, and thereafter outputs the same to the monitor 7 to display the image of the resultant video signal.

At this time, the DSP 4 converts the video signal outputted from the CCD driving unit 3 into a predetermined format of a luminance signal and a color signal to thus output the same to the image compressing/restoring unit 5 for the purpose of image compression and transmission to the outside.

The image compressing/restoring unit 5 executes compression in JPEG(Joint Photographic Experts Group) and MPEG(Moving Picture Expert Group) according to the type of the inputted video signal, and the compressed video signal is transmitted to the communication lines and the voice input/output unit 9 via the communication control and interfacing unit 8.

And, such a signal flow is controlled by the controlling unit 6.

As a data communication method utilizing a modem, i.e., the communication control and interfacing unit 8, in the image communication apparatus, there are a HDLC(High-Level Data Link Control) method and a NON-PROTOCOL method. The HDLC method is commonly being used. This will be explained with reference to FIG. 2.

FIG. 2 is a view illustrating a frame structure based on the HDLC method in case of modem data transmission according to the conventional art. That is, it is a frame structure for showing a data communication method utilizing the HDLC method.

As illustrated therein, in the HDLC method, a frame consists of a start flag(START Flag) representing the start of a frame, a data information(audio/video/control) to be transmitted, a CRC (Cyclic Redundancy Checking) code, i.e., an error detecting code, and a stop flag(STOP Flag) representing the stop of a frame.

In the above HDLC structure, the start and stop flag representing the start and stop of a frame contains a flag pattern of '01111110($7E_{HEC}$)' as a combination of 8 bits for the purpose of frame synchronization. Such a flag synchronization method is a method for maintaining synchronization between a transmitter side and a receiver side all the time by sending a code of a predetermined pattern although there is no data to be transmitted. Here, the aforementioned predetermined pattern is called as the flag pattern of '01111110($7E_{HEC}$)'.

The receiver side, i.e., a modem, receiving such flags delivers data information to the controlling unit 6 after removing the start and stop flags.

In addition, a data information followed after the start flag and containing audio/video/control data is transmitted in a predetermined number of bytes. At this time, a data byte has a structure of 8 bits. However, a start bit and a stop bit are appended to both ends of the 8-bit structure, and thus the data byte is transmitted in 10 bits.

In addition, to search each of the audio/video/control data, a CRC code is contained in the data information itself.

In addition, only in case of a flag(01111110), a data stream has five consecutive 1's. Thus, in the case where original data information to be transmitted has six consecutive 1's, '0'(zero insert) is forcibly appended next to the fifth 1, whereby the start flag is distinguished from the stop flag and then the receiver side removes '0' followed after five consecutive 1's.

Thereafter, the data stream is followed by the CRC code(error detection code), which is a combination of 16 bits, and checks whether there is an error or not in portions excepting the start and stop flags.

Meanwhile, a data communication method utilizing a modem, i.e., a communication control and interfacing unit 8 in the image communication apparatus includes the NON-PROTOCOL method. This will be explained with reference to FIG. 3.

FIG. 3 is a frame structure according to the NON-PROTOCOL method of the conventional art.

As illustrated therein, a data having a data stream alone is directly transmitted.

On the other hand, firstly, a transmission protocol for discrimination of files such as audio, video, control data, etc. of the above transmitted data information is established between the transmitter side and the receiver side, and then the transmitter side transmits data to the receiver side according to this protocol, for example, in the promise that the ratio of video to control is 3:2. Therefore, it is difficult for the receive side to discriminate files, and in the case where data transmission is carried out by changing the above transmission protocol within the range of a predetermined number of files, those files must be newly discriminated.

As described above, in the HDLC method according to the conventional art, a data information(audio/video/control/etc.) has another CRC code after acquiring the CRC code for error detection by using a modem line, so there is a problem that a redundancy occurs as much as the CRC code.

In addition, in the HDLC method according to the conventional art, although an overhead of a data byte, i.e., a data byte is 8 bits, 10 bits are actually transmitted in order to transmit the data byte because a start and a stop bit are appended upon transmission. Thus, data loss per second is increased, and the size of the data loss is also increased.

In addition, in the HDLC method according to the conventional art, '0' is forcibly appended next to the fifth 1 in order to prevent the case where a data of a data information has five consecutive 1's is applied only to flags. That is, '0' is inserted in order to prevent the case where the data contains the same data as the start/stop flags. Thus, there is a problem that the overhead of the data information is increased due to zero insertion and the receiver side must remove the inserted '0'.

In addition, in the NON-PROTOCOL method according to the conventional art, firstly, a transmission protocol for discrimination of files such as audio, video, control data, etc. of the above transmitted data information is established between the transmitter side and the receiver side, and then the transmitter side transmits data to the receiver side according to this protocol. Therefore, it is difficult for the receive side to discriminate files.

In addition, in the NON-PROTOCOL method according to the conventional art, in the case where data transmission is carried out by changing the above transmission protocol within the range of a predetermined number of files, those files must be newly discriminated.

SUMMARY OF THE INVENTION

Accordingly, it is an object of the present invention to provide a data transmission protocol for an image communication apparatus which is capable of minimizing loss of data other than video and audio data and has a structure in which video, audio, and control data are multiplexed for communication.

It is another object of the present invention to provide a data transmission protocol for an image communication apparatus which is capable of easily separating video, audio, and control data when a receiver side reads a data packet and setting its control data so as to select an image quality and a retransmission privacy mode.

It is still another object of the present invention to provide a data transmission protocol for an image communication apparatus which is capable of minimizing loss of data other than video data using a structure for changing a data size according to a compression image data size in a method for checking an image error from a video and audio data array.

To achieve the above objects, in an image communication apparatus for compressing video and audio data of an image and transmitting them, there is provided a data transmission protocol for an image communication apparatus, in which a packet data frame includes: a header data for separating video data and audio data; a transmission and reception data size based on a communication speed; a compressed audio data and video data; a control index representing an information for indicating an additional operation; and a control data for notifying a receiver side of data relating to the additional operation.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein:

FIG. 4 is a view illustrating a frame structure of a data transmission protocol for an image communication apparatus according to one embodiment of the present invention;

FIGS. 5A and 5B are views illustrating a video and audio data array; and

FIG. 6 is a view illustrating a video data size array.

DETAILED DESCRIPTION OF THE PREFERRED EMBODIMENTS

FIG. 4 is a view illustrating a frame structure of a data transmission protocol for an image communication apparatus according to one embodiment of the present invention.

As illustrated therein, a packet frame includes: a header data for separating video data and audio data; a transmission and reception data size based on a communication speed; a compressed audio data and video data; a control index representing an information for indicating an additional operation; and a control data for notifying a receiver side of data relating to the additional operation.

First, the header data is an information for checking synchronization between a receiver side and a transmitter side and separating video and audio data, which is allocated 2 bytes.

In other words, the header data is used for providing synchronization between the receiver side and the transmitter side in the case where a problem occurs to the start and stop portions of data at the receiver and transmitter sides, and to a communication environment, and it is also used for detecting the start(interval) of video and audio data for receiving video and audio data by a multiplexer.

The data size information designates a transmission and received data size according to a communication speed, which is allocated 1 byte.

Meanwhile, with respect to the data size information, since the size of the packet data frame varies according to the communication speed, the transmitter side receives the data size information.

By utilizing the data size information, the position of the header data of the next frame can be found when consecutive packet data frames are transmitted and received. Thus, the receiver side can easily separates a mixture of many packets.

Figure 1:
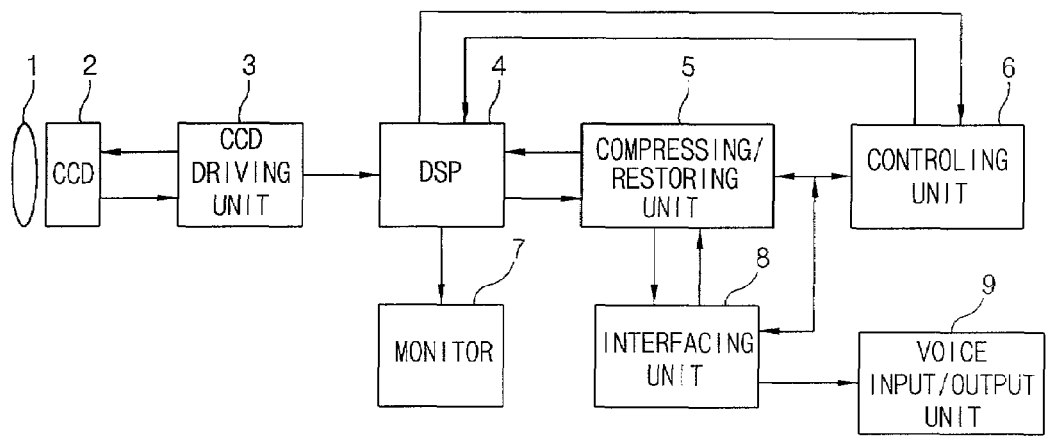
FIG. 1 is a view illustrating the construction of an image communication apparatus according to the conventional art.
Figure 2:
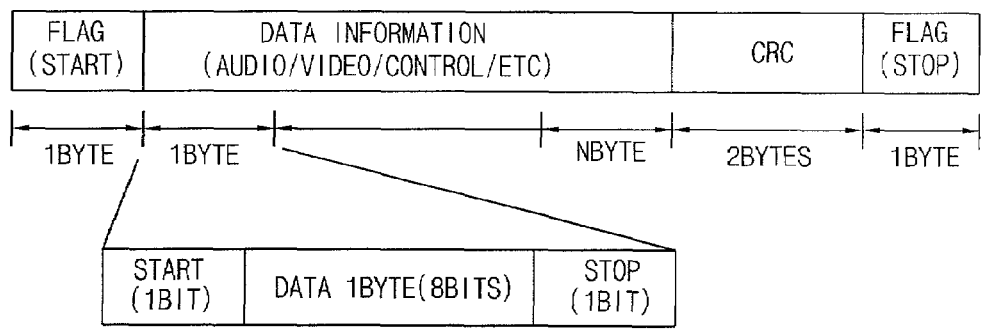
FIG. 2 is a view illustrating a frame structure based on the HDLC method when modem data transmission is carried out according to the conventional art.
Figure 3:
FIG. 3 is a view illustrating a frame structure based on the NON-PROTOCOL method according to the conventional art.

The compressed audio data is an audio data compressed by the image communication apparatus as illustrated in FIG. 1 for the purpose of image communication, and is a compressed information on an audio data received for 30 msecs. The size thereof ranges from 20 bytes to 24 bytes approximately.

The control index represents the information for indicating the additional operation, which allocates 1 byte as a flag. Hereinafter, the additional operation will be described in detail.

First, the control index information selects the quality of the image of the other party. In other words, it represents an information for remote-controlling the quality of the image of the other party so as to be receivable.

In addition, the control index information represents an information for requesting the retransmission of the image. In other words, it sets a flag for requesting retransmission if a data error is detected by checking the CRC of the received image data.

In addition, the control index information is a security mode for privacy protection, and it represents the inverse of video data and audio data or the reverse of audio data and video data, which is checked before restoration, and then restored.

In addition, the control index information designates the conversion of an image data size. In other words, when the size of a compressed screen ranges from a number of Kbytes to scores of Kbytes, the control index information designates a sequence number used for error detection and the position at which the CRC is to be appended.

Meanwhile, the control data performs an operation for notifying the receiver side of data relating to the additional operation. Namely, it is arranged for use in notifying the receiver side of the data relating to an index set in the control index.

In other words, the control data becomes an information for requesting the compression ratio of a video data to be transmitted, when the control index information is controlled to select the quality of the image of the other party.

In addition, the control data represents a sequence number for requesting a retransmission when the retransmission of the image data is requested in the control index information, and represents the information of a packet size(SN+CRC+DATA) of the image data when the image data size is changed.

Here, the compressed video data is made for image communication, and is a video data compressed by the image communication apparatus as in FIG. 1. The rest of the data of 30 msecs or less excepting the header, data size, audio data, control index, and control data is contained in the compressed video data. This will be described in detail with reference to FIGS. 5A and 5B.

FIGS. 5A and 5B are views illustrating a video and audio data array. In other words, they illustrates a data array for explaining the inverse or reverse of video or audio data.

As illustrated therein, FIG. 5A explains the inverse of video or audio data, i.e., an array of the inverse of video data A or audio data B.

FIG. 5B explains the reverse of video or audio data, i.e., the reverse of an video or audio data from A to Z or vice versa. This will be described in detail with reference to FIG. 6.

FIG. 6 is a view illustrating a video data size array. In other words, it illustrates how the video data size is arranged, and designates a video data array according to the change in the vide data size (which is represented by the control index information).

For example, in the case where the data size is less than 15 Kbytes, the sequence number(SN) and the CRC are inserted for each 64 bytes or 128 bytes. In the case where the data size is more than 15 Kbytes, the sequence number(SN) and the CRC are inserted for every 256 bytes or 2048 bytes.

As described above, the data transmission protocol for the image communication apparatus of the present invention has a structure in which video, audio, and control data are multiplexed for communication, and can minimize the loss of data other than video and audio data.

In addition, with the data transmission protocol for the image communication apparatus of the present invention, video, audio, and control data cab be easily separated when the receiver side reads one packet data, and the control data can be set for use in selecting an image quality and a retransmission privacy mode.

In addition, the data transmission protocol for the image communication apparatus of the present invention has a structure for changing a data size according to a compressed image data size, and accordingly can minimize loss of data other than video data, in the method for checking a video error from a video and audio data array.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an image communication apparatus for compressing video and audio data of an image and transmitting them, a packet data transmission protocol, in which one packet data frame comprises:

header data containing information for separating video data and audio data and for synchronizing between a transmitter side and a receiver side;

transmission and reception data size information based on a communication speed that varies based on a compression ratio of the video data;

compressed audio data and video data;

a control index representing information for indicating an additional operation from the group consisting of an image quality selection, an image retransmission, a privacy mode and a change in the size of video data and designation of conversion of image size data; and control data for notifying the receiver side of data relating to the additional operation, for representing information for requesting the compression ratio of the video data to be transmitted when the control index is controlled to select the quality of the transmitted image, and for representing a sequence number for requesting the image retransmission when the retransmission of the image data is requested in the control index.

2. The data transmission protocol according to claim 1, wherein the control data represents information of a packet size of the image data when the control index represents a change in the image data size.

3. The data transmission protocol according to claim 1, wherein the privacy mode is an information for representing an inverse of video or audio data and a reverse of video or audio data.

4. The data transmission protocol according to claim 3, wherein, in the privacy mode, the video or audio data is transmitted in the inverse or reverse state according to the control data and the control index.

5. The data transmission protocol according to claim 1, wherein, in the image data size, the sequence number and a Cyclic Redundancy Checking (CRC) code are inserted for each different image data size based on a predetermined value according to the change in the image data size indicated by the control index.

6. The data transmission protocol according to claim 5, wherein, when the data size is less than 15 Kbytes, the sequence number and the CRC are inserted for every 64 bytes or 128 bytes.

7. The data transmission protocol according to claim 5, wherein, when the data size is more than 15 Kbytes, the sequence number and the CRC are inserted for every 256 bytes or 2048 bytes.

* * * * *